United States Patent
St. Pierre

[11] Patent Number: 6,034,977
[45] Date of Patent: Mar. 7, 2000

[54] OPTICAL PATH DIFFERENCE CONTROL SYSTEM AND METHOD FOR SOLID STATE LASERS

[75] Inventor: Randall J. St. Pierre, Santa Monica, Calif.

[73] Assignee: TRW Inc., Redondo Beach, Calif.

[21] Appl. No.: 09/024,137

[22] Filed: Feb. 17, 1998

[51] Int. Cl.[7] .................................................. H01S 3/04
[52] U.S. Cl. .......................... 372/34; 372/29; 372/33; 372/36; 372/39; 372/69; 372/70
[58] Field of Search .............................. 372/29, 33, 34, 372/35, 36, 39, 40, 69, 70, 71, 108

[56] References Cited

U.S. PATENT DOCUMENTS

| | | | |
|---|---|---|---|
| 3,679,999 | 7/1972 | Chernoch | 372/34 X |
| 4,563,763 | 1/1986 | Kuhn | 372/35 |
| 4,637,028 | 1/1987 | Kahan | 372/34 |
| 4,675,874 | 6/1987 | Pohler et al. | 373/33 |
| 4,761,789 | 8/1988 | Fukae | 372/34 |
| 4,782,492 | 11/1988 | McMahon et al. | 372/34 |
| 4,823,348 | 4/1989 | Hercher | 372/32 |
| 4,852,109 | 7/1989 | Kuchar | 372/34 |
| 4,949,346 | 8/1990 | Kuper et al. | 372/36 |
| 5,084,898 | 1/1992 | Dorschner et al. | 372/107 |
| 5,546,416 | 8/1996 | Basu | 372/34 |
| 5,774,489 | 6/1998 | Moulton et al. | 372/34 X |
| 5,889,803 | 3/1999 | Pfeiffer et al. | 372/34 |

*Primary Examiner*—Brian Healy
*Attorney, Agent, or Firm*—Michael S. Yatsko

[57] ABSTRACT

A method of controlling the thermal optical path difference (OPD) in a lasing medium in a solid state laser during pumping of a lasing medium 10 including a pair of side faces 12 for receiving radiation during pumping and a pair of edge faces 16, comprises the steps of determining a temperature difference, $\Delta T_{min}$, between the side faces and the edge faces that corresponds with approximately a minimum, $OPD_{min}$, in the OPD, and maintaining about $\Delta T_{min}$ during pumping of the lasing medium, such that the OPD is maintained at approximately $OPD_{min}$. The temperature difference is maintained by controlling heat transfer at the edge faces of the lasing medium. The temperature difference between the edge faces and the side faces can be actively controlled such that the method can be automated.

24 Claims, 3 Drawing Sheets

OPTICAL PATH DIFFERENCE CONTROL SYSTEM AND METHOD FOR SOLID STATE LASERS

STATEMENT OF GOVERNMENT SUPPORT

This invention was conceived during the course of Contract No. DAAB07-91-C-K504 for the Department of Army. The government has certain rights in this invention.

BACKGROUND

The present invention is directed to the field of solid state lasers and, more particularly, to a system for controlling the optical path difference in the lasing medium.

Solid state lasers typically comprise a lasing medium having a slab geometry. The lasing medium includes side faces and edge faces. During operation of the laser, the side faces are pumped by a radiation source to generate a laser beam. The pumping process creates a substantial amount of excess heat within the lasing medium. Surface cooling of the side faces and edge faces is conventionally utilized to remove some of this excess heat from the lasing medium, so as to control its temperature. Ideally, the temperature distribution throughout the lasing medium is uniform to eliminate temperature gradients which produce associated thermal strains and index variations. Thermal strains produce thermal dimensional distortions in the lasing medium.

Temperature gradients through the thickness of the lasing medium are averaged out by passing the laser beam along the length of the lasing medium in a zig-zag pattern. Temperature gradients across the width of the lasing medium are controlled by using edge control bars disposed at the edge faces.

Surface cooling does not achieve temperature uniformity within the lasing medium, however, and thermal distortion of the lasing medium causes associated detrimental effects on the laser beam. Consequently, the laser beam quality and average power capabilities of known solid state lasers are limited. The thermal strains and associated thermal distortions cause a thermal optical path difference (OPD) in the lasing medium. The OPD causes different portions of the laser beam to travel at different speeds through the lasing medium relative to other portions. As a result, the laser beam has a non-flat wavefront.

It is important to control the OPD in the lasing medium to maintain a high level of optical quality needed to achieve high performance of the solid state laser system. An increase in the OPD results in reduced performance of the laser by limiting the laser beam average power and diminishing the laser beam quality. The OPD can reach such a high level that the laser is unsuitable for use in certain applications such as phase conjugation or unstable resonator which require precise OPD control.

Thus, there is a need for a method and apparatus for closely controlling the OPD in a lasing medium in a solid state laser system that overcomes the above-described deficiencies of known techniques.

SUMMARY

The present invention provides a method and apparatus for controlling the thermal optical path difference (OPD) of a lasing medium in a solid state laser that satisfies this need. The lasing medium includes a pair of side faces that are optically pumped by a light source and a pair of edge faces. The method comprises controlling heat transfer through the outer surface of the lasing medium to control the OPD. Particularly, the method comprises determining a temperature difference, $\Delta T_{min}$, between the side faces and the edge faces that corresponds with approximately a minimum, $OPD_{min}$, in the value of the OPD in the lasing medium.

The value of $\Delta T_{min}$ is determined for a given solid state laser configuration. For the configuration, $\Delta T_{min}$ is substantially independent of the duty (pulse repetition) cycle of the pump source and $OPD_{min}$ corresponds with about a constant value of $\Delta T_{min}$ over a range of duty cycles. $\Delta T_{min}$ can be determined at one duty cycle level and this temperature difference can be maintained at other duty cycle levels of the pump source as well. $\Delta T_{min}$ can be predetermined, or alternately it can be determined during the laser system operation. Once $\Delta T_{min}$ is determined for a laser configuration, this temperature difference can be maintained during pumping of the lasing medium to maintain the OPD at about $OPD_{min}$.

The temperature difference, $\Delta T$, between the edge faces and the side faces of the lasing medium is controlled by controlling heat transfer at the edge faces. This is achieved by monitoring the temperatures of at least one of the edge faces and at least one of the side faces of the lasing medium during laser operation, and adjusting the temperature of the edge faces as needed to maintain about $\Delta T_{min}$.

$\Delta T$ can be actively controlled using feedback circuitry such that the method can be automated. Consequently, $OPD_{min}$ can be automatically maintained during the operation of the solid state laser, thus enabling the production of a consistent, high-quality laser beam.

The system for controlling the OPD of the lasing medium during operation of the solid state laser comprises at least one sensor for monitoring the temperature of the edge faces of the lasing medium; at least one sensor for monitoring the temperature of the side faces of the lasing medium; means connected to the temperature sensors for determining the temperature difference, $\Delta T$, between the edge faces and the side faces; and means for controlling the edge face temperature such that $\Delta T$ equals about $\Delta T_{min}$ and OPD equals about $OPD_{min}$.

The temperature of the edge faces of the lasing medium can be controlled using edge control bars. The edge control bars can heat and/or cool the edge faces depending on the edge control bar configuration.

The OPD can be measured using conventional interferometry techniques.

DRAWINGS

These and other features, aspects and advantages of the present invention will become better understood from the following description, appended claims and accompanying drawings, where:

DESCRIPTION

Figure 1:
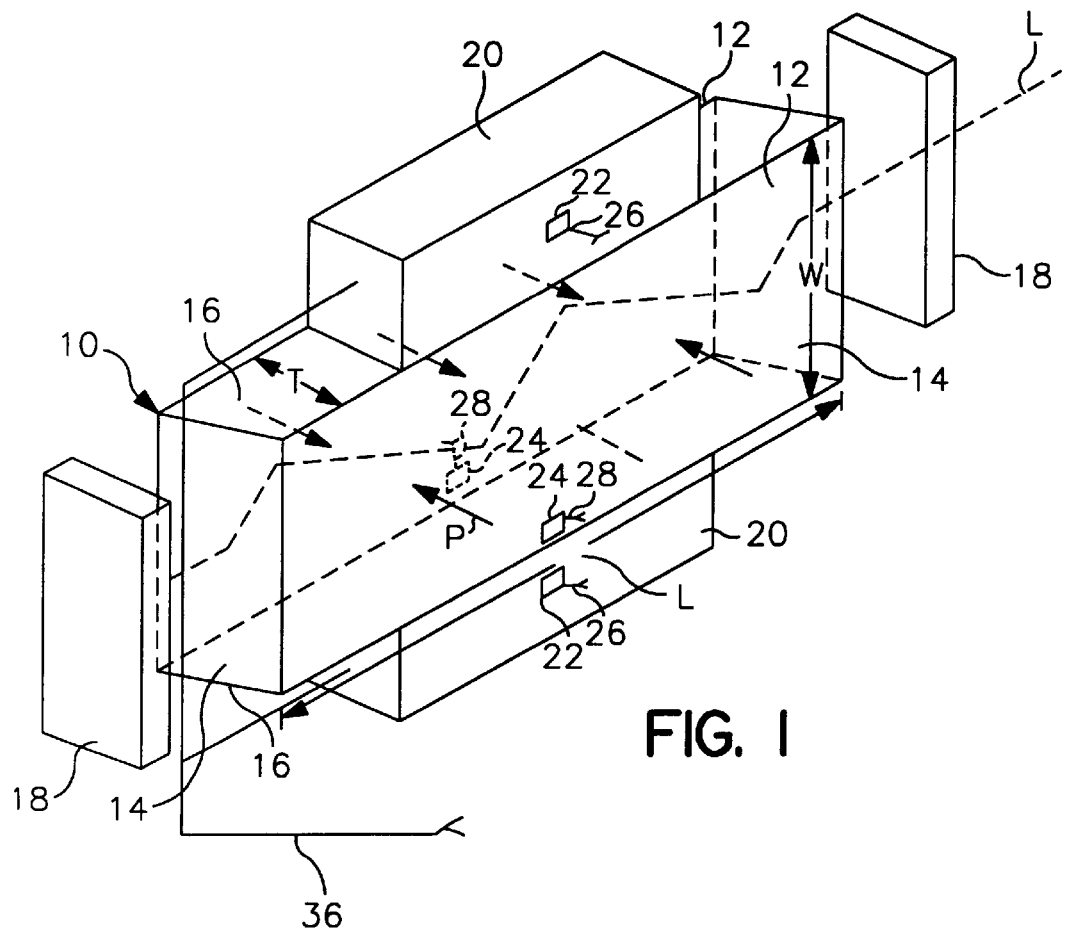
FIG. 1 is a schematic illustrational view of a zig-zig solid lasing medium in a solid state laser being optically pumped at its side faces, and showing temperature sensors located to measure the temperatures at the edge faces and the side faces during pumping.

The present invention is a method and apparatus for controlling the thermal optical path difference (OPD) in a lasing medium in a solid state laser. FIG. 1 illustrates a typical parallelepiped-shaped slab lasing medium 10 including side faces 12, edge faces 16 and end faces 14. The lasing medium 10 has a length L, a width W, and a thickness T. During operation of the laser, the side faces 12 are optically pumped by a light source such as laser diode arrays or flash lamps as depicted by arrows P, to generate a laser beam B. The laser beam B is passed longitudinally along the lasing medium 10 in a zig-zag pattern by internal reflections from the side faces 12. The lasing medium 10 is typically disposed in a resonator cavity, with mirrors 18 positioned adjacent to the end faces 14 or used as an amplifier to amplify the laser beam B produced by a resonator cavity.

The pumping of the side faces 12 generates a substantial amount of heat which increases the temperature of the lasing medium 10. Due to the generally poor thermal conductivity of the lasing medium 10 as well as non-uniform heating effects, the temperature profile within the lasing medium 10 is non-uniform. As a result of the non-uniform temperature profile, the lasing medium 10 is thermally strained and distorted. An important effect of the thermal distortion of the lasing medium 10 is the distortion of the laser beam B wavefront passing through the lasing medium 10 caused by some portions of the wavefront traveling at a greater speed through the laser medium 10 relative to other portions of the wavefront due to the distortions and dimensional changes in the lasing medium 10. This non-uniformity of the wavefront speed produces a non-flat wavefront. The lasing medium 10 is referred to as having an optical path difference (OPD). The OPD increases with an increase in the thermal distortion of the lasing medium 10. Increasing the OPD limits the average power output of the laser achievable for a given laser beam quality.

The OPD is dependent on the composition and thermal conductivity of the material of the lasing medium 10. As the thermal conductivity of the lasing medium 10 decreases, the ability to control temperature gradients in the lasing medium 10 by surface cooling techniques is diminished, making it generally more difficult to control the OPD.

Propagating the laser beam B in a zig-zig pattern between the side faces 12 through the lasing medium 10 (i.e., in the thickness T direction) reduces the OPD, by averaging the laser beam B over the temperature aberrations in the thickness direction.

Thermal distortion of the lasing medium 10 is typically further controlled by surface cooling the lasing medium 10 during pumping. The temperature profile across the side faces 12 (i.e., across the width W of the lasing medium 10) is ideally uniform so that the temperature distribution is one-dimensional. The temperature profile across the edge faces 16 (i.e., across the thickness T of the lasing medium) is ideally symmetrical.

The side faces 12 are typically cooled by flowing a coolant such as water over them. The side faces 12 are typically at a surface temperature of within about 10° F. of the temperature of the coolant.

The edge face 16 temperature is typically controlled by edge control bars 20 which control heat transfer to and from the edge faces 16. The edge control bars 20 reduce the temperature gradient in the width W direction of the lasing medium 10 by heating and/or cooling the edge faces 16. The edge control bars 20 can comprise a fluid circuit for flowing liquids or gases at a selected temperature and flow rate through the edge control bars 20 to heat and/or cool the edge faces 16. The edge control bars 20 can optionally be electrically heated to heat the edge faces 16. The edge control bars 20 can be independently controlled.

According to the present invention, the temperature difference, $\Delta T$, between the temperature, $T_e$, of the edge faces 16, and the temperature, $T_s$, of the side faces 12, of the lasing medium 10 (i.e., $\Delta T = T_e - T_s$) can be controlled during pumping of the lasing medium 10 to control the OPD. Particularly, there is a value of $\Delta T$, $\Delta T_{min}$, that corresponds with about a minimum in the OPD, $OPD_{min}$. Once $\Delta T_{min}$ is experimentally determined for a given laser configuration, the temperature difference can then be maintained at about $\Delta T_{min}$ to maintain the OPD at about $OPD_{min}$ during pumping of the lasing medium 10.

The edge control bars 20 are heated or cooled depending on whether they absorb or reflect heat generated by the pump source. If the edge control bars 20 are optically absorptive, they are cooled during pumping to maintain the temperature difference, $\Delta T_{min}$. If the edge control bars 20 are optically reflective, they are heated during pumping to maintain the temperature difference, $\Delta T_{min}$.

The temperature difference, $\Delta T$, between the edge faces 16 and the side faces 12 can be determined by monitoring the temperatures of at least one of the edge faces 16 and at least one of the side faces 12 using respective temperature sensors 22, 24. Preferably, sensors 22 are placed on both control bars 20 and sensors 24 are placed at both side faces 12 as shown in FIG. 1. The sensors 22, 24 can detect problems with the cooling of the side faces 12 and with the performance of the edge control bars 20. The sensors 22, 24 can be, for example, an electrical resistor such as a thermistor or the like, having a resistance that varies with temperature. As depicted in FIG. 1, the sensors 22 for monitoring the temperature of the edge faces 16 can be disposed on the outer surface of the edge control bars 20. The sensors 22 are typically disposed inside the edge control bars 20. Preferably, the sensors 22 are located as near to the edge faces 16 as possible so that the temperatures measured by the sensors 22 are about the actual temperature of the edge faces 16.

Figure 2:
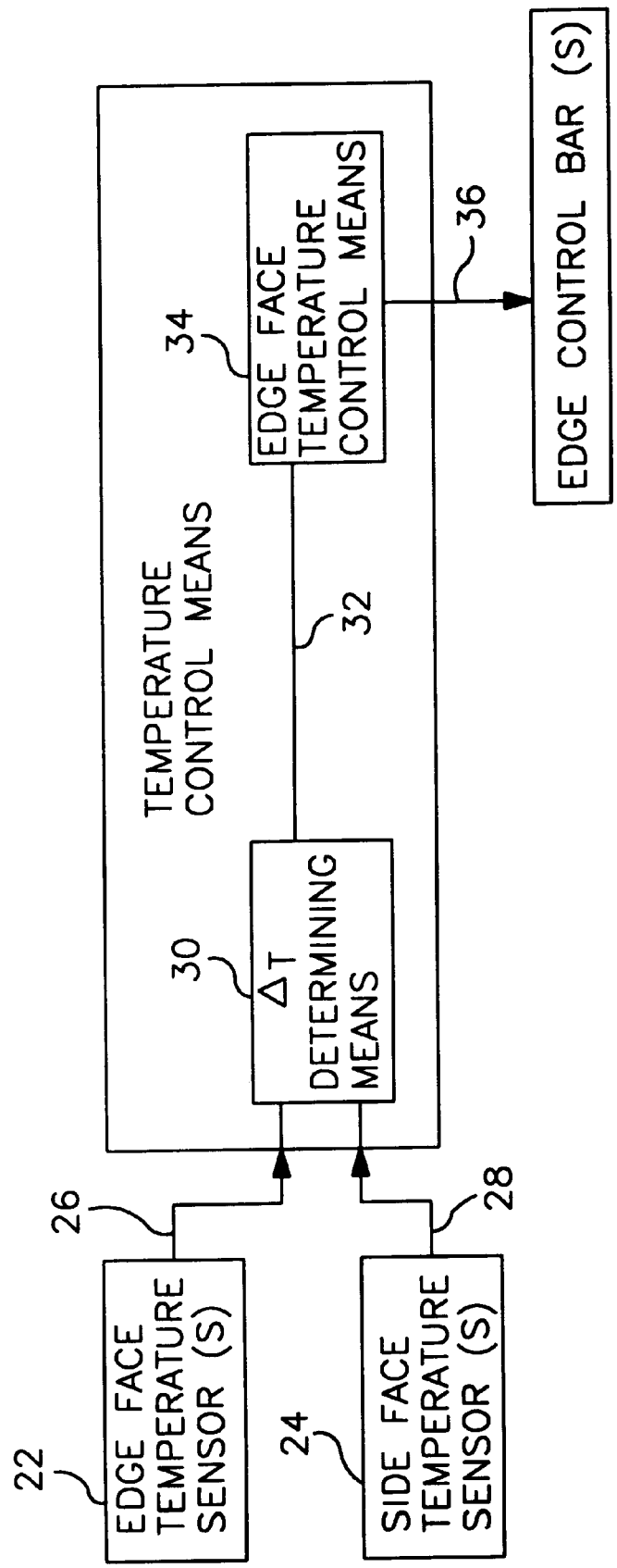
FIG. 2 is a schematic block diagram showing the loop between the temperature sensors, the temperature control means and the edge control bars.

The operation of the edge control bars 20 are controlled by a temperature control means. Referring to FIG. 2, the sensors 22, 24 are connected via respective electrical conductors 26, 28 to a means 30 for determining $\Delta T$. The $\Delta T$ determining means 30 can be, for example, a voltmeter or the like. The $\Delta T$ determining means 30 is connected via an electrical conductor 32 to a control means 34 for controlling the temperature at the edge faces 16. The control means 34 is connected to the edge control bars 20 via electrical conductors 36. The control means 34 can be a device such as a proportional output controller that provides an output to the edge control bars 20 that is proportional to $\Delta T$. The control means 34 can include a digitally controlled on/off switch (not shown).

Typically, the lasing medium 10 is pumped in about the same manner at both of the side faces 12 and both side faces 12 are cooled such that the temperatures of the side faces 12 are approximately equal. Accordingly, it is typically sufficient to measure the temperature at only one of the side faces 12 and to assume the other side face 12 is at this same temperature. In lasers in which only one side face 12 is pumped due to the laser configuration, the approximate temperature of the non-pumped side face 12 can be extrapolated from the measured temperature of the pumped face. The side face 12 temperature can then be determined based on some selected relationship between the measured temperature and the extrapolated temperature, such as the average temperature.

Similarly, the temperatures of the edge faces 16 of the lasing medium 10 are typically approximately equal, and so it is typically sufficient to measure the temperature at only one of the edge faces 16. The average temperature or some other selected relationship between the two edge faces 14 can be determined in lasers which do not control the temperature of both of the edge faces 16.

The OPD can be determined using a conventional interferometer such as a Mach-Zehnder interferometer or the like.

The values of $\Delta T_{min}$ and $OPD_{min}$ can be either predetermined or determined as the laser system is actually being operated to perform some function. Preferably, these two values are predetermined. As described below, once the value of $\Delta T_{min}$ is determined for a given laser configuration, this value can be used to optimize the OPD under different pumping conditions of the lasing medium 10.

The value of $\Delta T_{min}$ depends on various factors including the distance between the location of the edge face sensors 22 and the edge faces 16, the composition of the bonding material used to bond the edge control bars 20 to the edge faces 16, and the composition of the lasing medium 10. As the laser configuration is changed, the value of $\Delta T_{min}$ can change also.

Tests were conducted to determine the value of $\Delta T_{min}$ for a Nd:YAG slab lasing medium having a configuration as shown in FIG. 1. The side faces of the lasing medium were pumped by diode laser arrays at duty (pulse repetition) cycles of 20 Hz, 30 Hz and 40 Hz, and also under static conditions with the diode lasers turned off. The side faces of the lasing medium were water cooled. The temperatures of both of the edge faces was controlled using edge control bars. Temperature sensors were located at approximately the center of each of the side faces close to the edge and on each of the edge control bars. The OPD was measured using a Mach-Zehnder interferometer including a He—Ne laser.

Figure 3:
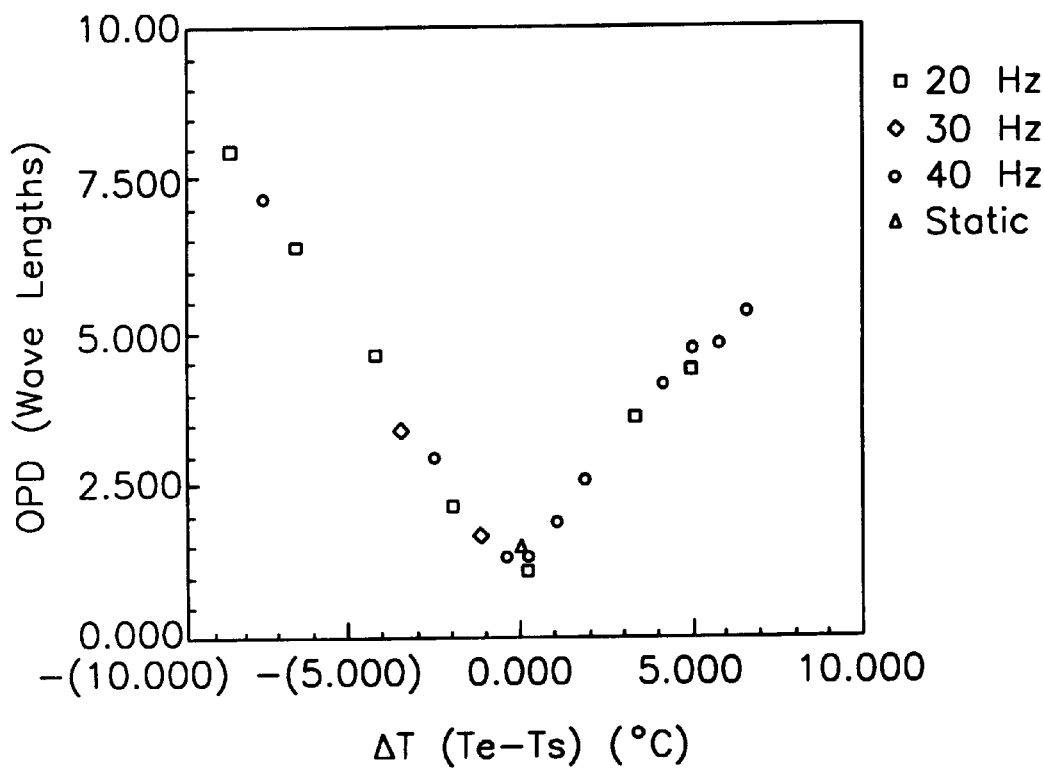
FIG. 3 is a plot of experimental data for the optical path difference (OPD) versus the difference in temperature ($\Delta T$) between the edge faces and the side faces of the lasing medium over a range of duty cycles of the pump source, showing a minimum in the OPD.

Referring to FIG. 3, the value of $\Delta T_{min}$ was about 0° C. for each of the four test conditions for the laser configuration. The value of $OPD_{min}$ was about 1.5 wavelengths (wave peak—wave valley) of the He—Ne laser at this temperature. Accordingly, the test results establish that, for a given laser configuration, the value of $\Delta T_{min}$ need not be redetermined for different duty cycles of the pump source, and $\Delta T_{min}$ is also applicable to maintain the OPD at about $OPD_{min}$ at other pumping conditions.

The approximately constant value of $\Delta T_{min}$ over a range of duty cycles for a given laser configuration enables the temperature difference between the edge faces and the side faces of the lasing medium to be actively controlled such that the present method can be automated using a temperature control system with automatic feedback circuitry such as shown in FIG. 2. Consequently, $OPD_{min}$ can be closely maintained during the operation of solid state lasers, thus enabling the production of a consistent, high-quality laser beam that is advantageous for a range of applications, and especially those that require precise control of the OPD.

Although the present invention has been described in considerable detail with reference to certain preferred embodiments thereof, other embodiments are possible. Therefore, the scope of the appended claims should not be limited to the description of the preferred embodiments contained herein.

What is claimed is:

1. A method of minimizing the thermal optical path difference of a lasing medium in a solid state laser, the lasing medium including an outer surface, the method comprising the step of controlling heat transfer through the outer surface of the lasing medium during optical pumping of the lasing medium so as to achieve about a minimum of the optical path difference.

2. A method of controlling the thermal optical path difference of a lasing medium in a solid state laser, the lasing medium including a pair of side faces for receiving radiation during pumping and a pair of edge faces, the method comprising the step of maintaining a temperature difference, $\Delta T_{min}$, between the side faces and the edge faces during pumping of the lasing medium that corresponds with about a minimum, $OPD_{min}$, in the optical path difference of the lasing medium.

3. The method of claim 2, wherein the step of maintaining comprises monitoring the temperature of at least one of the edge faces of the lasing medium during pumping and adjusting the temperature at each of the edge faces to maintain a temperature difference of about $\Delta T_{min}$.

4. The method of claim 3, wherein the step of maintaining comprises monitoring the temperature of each of the edge faces of the lasing medium during pumping.

5. The method of claim 2, wherein the step of maintaining comprises monitoring the temperatures of at least one of the edge faces and at least one of the side faces of the lasing medium during pumping, and adjusting the temperature at each of the edge faces to maintain a temperature difference of about $\Delta T_{min}$.

6. The method of claim 5, wherein the step of maintaining comprises monitoring the temperature of each of the edge faces and each of the side faces of the lasing medium during pumping.

7. The method of claim 2, wherein the step of maintaining comprises actively maintaining a temperature difference of about $\Delta T_{min}$.

8. A method of actively controlling the thermal optical path difference of a lasing medium in a solid state laser, the lasing medium including a pair of side faces for receiving radiation during pumping and a pair of edge faces, the method comprising the steps of:
  a) monitoring the temperatures of the edge faces and the side faces of the lasing medium during pumping; and
  b) actively controlling the temperature of the edge faces to maintain a temperature difference, $\Delta T_{min}$, between the side faces and the edge faces during pumping that corresponds with about a minimum, $OPD_{min}$, in the optical path difference of the lasing medium.

9. The method of claim 8, wherein the step of controlling comprises actively adjusting the temperature of the edge faces during pumping to maintain a temperature difference of about $\Delta T_{min}$.

10. A method of controlling the temperature distribution in a lasing medium in a solid state laser, the lasing medium including a pair of side faces for receiving radiation during pumping and a pair of edge faces, the method comprising the step of controlling the temperature of the edge faces relative to the temperature of the side faces during pumping so as to achieve a temperature distribution within the lasing medium that corresponds with about a minimum, $OPD_{min}$, in the optical path difference in the lasing medium.

11. The method of claim 10, wherein the step of controlling comprises controlling heat transfer at least one of the edge faces of the lasing medium during pumping so as to control the temperature of the edge faces and to maintain an optical path difference of about $OPD_{min}$.

12. The method of claim 10, wherein the step of controlling comprises controlling heat transfer at both of the edge faces of the lasing medium during pumping.

13. The method of claim 10, wherein the step of controlling comprises monitoring the temperatures of at least one of the edge faces and at least one of the side faces of the lasing medium during pumping, and adjusting the temperature of the edge faces to maintain a temperature difference of about $\Delta T_{min}$.

14. The method of claim 13, wherein the step of controlling comprises monitoring the temperature of each of the edge faces and each of the side faces of the lasing medium during pumping.

15. The method of claim 10, wherein the step of controlling comprises actively controlling the temperature of each of the edge faces of the lasing medium during pumping to maintain a temperature difference of about $\Delta T_{min}$.

16. A system for controlling the thermal optical path difference in a lasing medium in a solid state laser, the lasing medium including an opposed pair of side faces for receiving radiation during pumping and an opposed pair of edge faces, the system comprising:

a) at least one edge face sensor, each for monitoring the temperature of one of the edge faces of the lasing medium;

b) at least one side face sensor, each for monitoring the temperature of one of the side faces of the lasing medium; and c) temperature control means connected to the edge face sensor and to the side face sensor for controlling the temperature difference, $\Delta T$, between the edge faces and the side faces during pumping of the lasing medium such that the optical path difference in the lasing medium is maintained at about a minimum, $OPD_{min}$.

17. The system of claim 16, comprising a pair of edge face sensors and a pair of side face sensors.

18. The system of claim 16, wherein the temperature control means comprises:

i) temperature difference determining means connected to the edge face sensor and to the side face sensor for determining $\Delta T$; and ii) edge face temperature control means connected to the temperature difference determining means to actively control the edge face temperature during operation of the laser such that the optical path difference in the lasing medium is maintained at about $OPD_{min}$.

19. The system of claim 16, wherein the temperature control means comprises:

i) temperature difference determining means connected to the edge face sensor and to the side face sensor for determining $\Delta T$;

ii) a pair of edge control bars, each disposed at one of the edge faces of the lasing medium; and iii) edge face temperature control means connected to the temperature difference determining means and to the edge control bars to actively control the edge control bars during pumping such that the optical path difference in the lasing medium is maintained at about $OPD_{min}$.

20. A solid state laser comprising:

a) a lasing medium including an opposed pair of side faces and an opposed pair of edge faces;

b) a pump source for optically pumping the side faces of the lasing medium;

c) at least one edge face sensor, each for monitoring the temperature of one of the edge faces of the lasing medium;

d) at least one side face sensor, each for monitoring the temperature of one of the side faces of the lasing medium; and e) temperature control means connected to the edge face sensor and to the side face sensor for controlling the temperature difference, $\Delta T$, between the edge faces and the side faces during pumping of the lasing medium such that the optical path difference in the lasing medium is maintained at about a minimum, $OPD_{min}$.

21. The solid state laser of claim 20, comprising a pair of edge face sensors and a pair of side face sensors.

22. The solid state laser of claim 20, wherein the lasing medium is comprised of Nd:YAG.

23. The solid state laser of claim 20, wherein the temperature control means comprises:

i) temperature difference determining means connected to the edge face sensor and to the side face sensor for determining $\Delta T$; and ii) edge face temperature control means connected to the temperature difference determining means to actively control the edge face temperature during operation of the laser such that the optical path difference in the lasing medium is maintained at about $OPD_{min}$.

24. The solid state laser of claim 20, wherein the temperature control means comprises:

i) temperature difference determining means connected to the edge face sensor and to the side face sensor for determining $\Delta T$;

ii) a pair of edge control bars, each disposed at one of the edge faces of the lasing medium; and iii) edge face temperature control means connected to the temperature difference determining means and to the edge control bars to actively control the edge control bars during pumping such that the optical path difference in the lasing medium is maintained at about $OPD_{min}$.

* * * * *